C. W. HUNT.
ANTI FRICTION BEARING.

No. 246,954. Patented Sept. 13, 1881.

Witnesses;
R. K. Evans
H. B. Applewhaite

Inventor;
C. W. Hunt
by A. H. Evans & Co
his Attorneys

UNITED STATES PATENT OFFICE.

CHARLES W. HUNT, OF WEST NEW BRIGHTON, NEW YORK.

ANTI-FRICTION BEARING.

SPECIFICATION forming part of Letters Patent No. 246,954, dated September 13, 1881.

Application filed February 4, 1880.

*To all whom it may concern:*

Be it known that I, CHARLES W. HUNT, a citizen of the United States, residing at West New Brighton, in the county of Richmond and State of New York, have invented new and useful Improvements in Anti-Friction Bearings; and I do hereby declare that the following is a full, clear, and exact description of the invention, which will enable others skilled in the art to which it appertains to make and use the same.

My invention appertains to that class of bearings designed especially for sheaves to hoist heavy loads; and my invention consists in certain details of construction and combination of parts, whereby I secure a durable and efficient anti-friction bearing which is non-separable when removed from the sheave.

Figure 1:
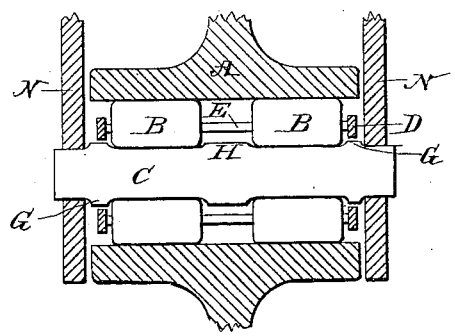
Figure 2:
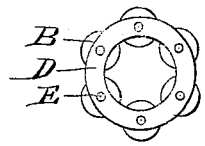
Figure 3:
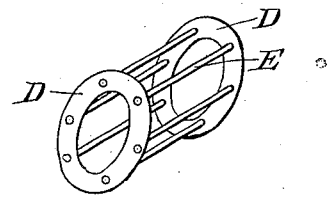

In the accompanying drawings, making part of this specification, Figure 1 is a vertical section through the bearing. Figs. 2 and 3 are details to be referred to.

In order that those skilled in the art may make and use my invention, I will proceed to describe the manner in which I have carried it out.

In the said drawings, C is the pin forming the journal of the bearing, and provided with a central hub or enlargement, H, and hubs or enlargements G G near each end. The anti-friction rollers B are of a proper length to lie against the pin C, between the hubs H and G, and are pivoted through their longitudinal centers on rods E, the ends of which are secured in rings D, arranged concentric with pin C.

Each series of rollers on each side of the central hub or enlargement may consist of as many as the diameter of the pin will allow to reach the best working results.

When the pin and rollers are removed from the sheave and hanger the rollers, roller-frame, and pin are non-separable, as the rods E have their ends upset after passing through the rings D. This is a very great advantage in shipping the bearings when intended for replacing worn-out bearings.

Having thus described my invention, what I claim as new, and desire to secure by Letters Patent, is—

The spindle C, provided with the central enlargement, H, and the end enlargements, G, in combination with the surrounding rollers arranged in series on rods E, and the ends of the rods secured in encircling rings D, whereby the bearing is non-separable, substantially as and for the purpose described.

CHARLES W. HUNT.

Witnesses:
J. W. ANDREAS,
DAVID B. DUNCAN.